US012585829B2

(12) United States Patent
Strogov et al.

(10) Patent No.: US 12,585,829 B2
(45) Date of Patent: Mar. 24, 2026

(54) REGISTRY CONTROL FOR INCIDENT RESPONSE

(71) Applicant: Acronis International GmbH, Schaffhausen (CH)

(72) Inventors: Vladimir Strogov, Singapore (SG); Alexey Kostyushko, Yerevan (AM); Aliaksei Dodz, Singapore (SG); Serg Bell, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 57 days.

(21) Appl. No.: 18/750,478

(22) Filed: Jun. 21, 2024

(65) Prior Publication Data

US 2025/0390608 A1     Dec. 25, 2025

(51) Int. Cl.
G06F 21/00 (2013.01)
G06F 21/55 (2013.01)
G06F 21/64 (2013.01)

(52) U.S. Cl.
CPC ............ G06F 21/64 (2013.01); G06F 21/554 (2013.01); G06F 2221/034 (2013.01)

(58) Field of Classification Search
CPC ... G06F 2221/034; G06F 21/554; G06F 21/64
USPC .......................................................... 726/1
See application file for complete search history.

(56) References Cited

U.S. PATENT DOCUMENTS

| | | | | |
|---|---|---|---|---|
| 6,820,136 | B1 * | 11/2004 | Pham | .................. G06F 11/2069 709/248 |
| 6,918,113 | B2 | 7/2005 | Patel et al. | |
| 8,099,596 | B1 | 1/2012 | Rusakov et al. | |
| 9,977,895 | B2 | 5/2018 | Danahy et al. | |
| 10,275,225 | B1 * | 4/2019 | Sunarno | .................. G06F 8/451 |
| 2003/0056112 | A1 * | 3/2003 | Vinson | ................ G06F 21/6218 726/17 |
| 2019/0081983 | A1 * | 3/2019 | Teal | ........................ G06F 21/50 |
| 2019/0251294 | A1 * | 8/2019 | Goodridge | .......... G06F 21/6281 |
| 2023/0385342 | A1 | 11/2023 | Berko et al. | |
| 2023/0388313 | A1 | 11/2023 | Berko et al. | |
| 2023/0388321 | A1 | 11/2023 | Berko et al. | |

(Continued)

FOREIGN PATENT DOCUMENTS

WO     WO-2020106512 A1 *  5/2020  ........... G06F 21/566

OTHER PUBLICATIONS

Acronis. The role of Incident Response Planning in ransomware defense, Jun. 26, 2023, https://www.acronis.com/en-us/blog/posts/ role-of-incident-response-planning-in-ransomware-defense/, The role of Incident Response Planning in ransomware defense.pdf.

(Continued)

*Primary Examiner* — Josnel Jeudy
(74) *Attorney, Agent, or Firm* — ESPE Legal Consultancy FZ-LLC

(57) ABSTRACT

Systems and methods for management of registry data within a computing environment, for example using a dual cache mechanism. The method comprises use of a fast registry cache and a persistent registry cache to manage different aspects of the registry call information. The method further comprises integration of the registry call information with endpoint detection and response support.

20 Claims, 5 Drawing Sheets

(56)                         References Cited

U.S. PATENT DOCUMENTS

2025/0156530 A1      5/2025  Pashkov et al.

OTHER PUBLICATIONS

Ivanyuk. Transforming incident management with the power of AI,
Dec. 21, 2023, https://www.acronis.com/en-us/cyber-protection-
center/posts/transforming-incident-management-the-power-of-ai-in-
acronis-cyber-protect-cloud-advanced-security-edr/, Transforming inci-
dent management with the power of AI.pdf.

* cited by examiner

REGISTRY CONTROL FOR INCIDENT RESPONSE

TECHNICAL FIELD

Embodiments relate to registry management. More particularly, embodiments facilitate capturing and managing registry changes using a dual cache system for security and remediation purposes.

BACKGROUND

In the field of registry data management, providing prompt security capabilities remains an important challenge. Traditional solutions for managing registry changes are slow and inefficient, often requiring extensive system resources, which presents technical challenges. For example, traditional solutions often cannot efficiently track changes made to the registry over time, especially when changes are made by multiple users or across distributed systems. Tracking deficiencies can provide limited visibility into the impact of registry changes on system performance, stability, and security, which can degrade overall system performance and increase response times in critical situations. Moreover, traditional solutions fail to ensure data integrity or accessibility, resulting in delays in detecting unauthorized or malicious changes, leaving systems vulnerable to security threats.

Therefore, there is a need for systems and methods that provide security and rapid response capabilities with reduced complexity.

SUMMARY

Embodiments described or otherwise contemplated herein substantially meet the aforementioned needs of the industry. Embodiments described herein include systems and methods for management of registry data within a computing environment, for example using a dual cache mechanism. By allowing configurable remediation actions for a dual cache mechanism, embodiments address the need for custom and proactive response strategies.

Embodiments are configured to capture and manage registry changes for efficient remediation purposes. Embodiments allow for rapid response capabilities, such as incident remediation.

In a feature and advantage of embodiments, the use of both a Fast Registry Cache (FRC) and a Persistent Registry Cache (PRC), allows for management of data acquisition, storage, access, maintenance, persistence, and security throughout the data lifecycle. For example, the FRC provides quick access to recently retrieved or modified registry keys/values for immediate response needs, while the PRC handles longer-term storage and complex data sets necessary for thorough incident analysis and remediation planning, according to embodiments.

In a feature and advantage of embodiments, the implementation of caches at the kernel mode allows for high-speed data processing and reduces the latency typically associated with user-mode interventions, enhancing overall system performance and security posture.

In a feature and advantage of embodiments, integration with an endpoint detection and response (EDR) system supports seamless and automated pushing of relevant registry changes based on predefined policies, enabling proactive responses to detected anomalies or potential threats.

In a feature and advantage of embodiments, interpretation of registry calls based on both pre-execution and post-execution states provides for efficient determination of the nature of changes and/or the appropriate response strategies. In an embodiment, interpretation of registry calls in the context of discrete execution states is combined along with a comparison to stored historical data.

In a feature and advantage of embodiments, support for configurable remediation actions can improve applicability and scalability. For example, differentiation between retrieval and modification of registry keys based on their states before and after execution adds a layer of customization and security.

In an embodiment, a system for capturing and managing registry changes comprises: a memory and at least one processor configured to implement an endpoint detection and response (EDR) driver. The EDR driver is configured to intercept a registry call at a kernel mode; determine registry call information associated with the registry call, wherein the registry call information includes a registry key, a registry value of the registry key, sub-keys of the registry key, values associated with the sub-keys, data associated with the registry key and its sub-keys, a security descriptors of the registry key or the sub-keys, a post-execution state of the registry call key or the sub-keys, and a pre-execution state of the registry call, wherein the pre-execution state of the registry call includes pre-execution values of the registry key and the sub-keys, a process of the registry call, an indication of a user, and a timestamp, wherein the pre-execution state of the registry call includes pre-execution values of the registry key and the sub-keys including at least one of: stored values of the registry key and the sub-keys in a fast registry cache (FRC), stored values of the registry key and the sub-keys in a local persistent registry cache (PRC), or original values of the registry key and the sub-keys in the system; store the registry call information in a fast registry cache (FRC) and in a persistent registry cache (PRC), wherein the PRC further stores historical registry call information; push the registry call information from the FRC to an EDR engine based on a predefined policy; receive, from the EDR engine, a request to provide the historical registry information to configure a remediation action, wherein the request is based on an incident including a registry change; and providing, to the EDR engine, the historical registry information stored in the PRC in response to the request.

In an embodiment, the pre-execution state of the registry call is based on a stored value of the registry key in a fast registry cache (FRC) and a stored value of the registry key in a local persistent registry cache (PRC).

In an embodiment, the pre-execution state of the registry call is based on an original value of the registry key in the system.

In an embodiment, the EDR driver is further configured to: receive, from the EDR engine, an indication to perform the remediation action; and perform the remediation action based on the indication. In an embodiment, the EDR engine is configured to perform the remediation action.

In an embodiment, the FRC is configured to temporarily store the registry call information based on a storage rule, for example, one or more of a mask rule, a hive rule, or a registry importance rule.

In an embodiment, the predefined policy includes at least one of real-time pushing, pushing based on predefined masks, pushing based on predefined hives, or pushing based on predefined registry importance.

In an embodiment, the EDR driver is further configured to determine that the registry value of the registry key or the values of the sub-keys were modified by the registry call based on a comparison of the post-execution state of the registry call to the pre-execution state of the registry call. In some examples, the determination that the registry value of the registry key or the values of the sub-keys were modified by the registry call is based on the stored values of the registry key and the sub-keys the PRC if the stored values of the registry key and the sub-keys are not in the FRC. In some examples, the determination that the registry value of the registry key or the values of the sub-keys were modified by the registry call is based on the original value of the registry key in the system.

In an embodiment, the EDR driver is further configured to: detect that the registry call is part of a transaction; determine transaction information associated with the transaction, including the registry key, the sub-keys, the registry value of the registry key, the values associated with the sub-keys, and the security descriptor of the registry key or the sub-keys involved in the transaction; determine an outcome of the transaction to be a commit or a rollback; store the transaction information in the fast registry cache (FRC) and the persistent registry cache (PRC); in the case of a commit, update the stored registry call information in the FRC and PRC to reflect the committed changes; and in the case of a rollback, revert the stored registry call information in the FRC and PRC to the pre-execution state of the registry call.

In an embodiment, the PRC further stores an actor associated with the registry call, or a timestamp associated with the registry call.

In an embodiment, a method to be implemented by an endpoint detection and response (EDR) comprises: intercepting a registry call at a kernel mode; determine registry call information associated with the registry call, wherein the registry call information includes a registry key and an associated value; determining the associated value of the registry key was modified by the registry call based on an execution status of the registry call, a post-execution state of the registry call, and a pre-execution state of the registry call; storing the registry call information in a fast registry cache (FRC) and in a persistent registry cache (PRC), wherein the PRC further stores advanced registry information including historical registry call information; pushing the registry call information from the FRC to an EDR engine based on a predefined policy; receiving from the EDR engine, a request to provide the advanced registry information to configure a remediation action, wherein the request is based on an incident including a registry change; and providing, to the EDR engine, the advanced registry information in response to the request.

In an embodiment, a method to be implemented by an endpoint detection and response (EDR) comprises: intercepting a registry call at a kernel mode; determining registry call information associated with the registry call, wherein the registry call information includes a registry key, a registry value of the registry key, sub-keys of the registry key, values associated with the sub-keys, data associated with the registry key and its sub-keys, a security descriptors of the registry key or the sub-keys, a post-execution state of the registry call key or the sub-keys, and a pre-execution state of the registry call, wherein the pre-execution state of the registry call includes pre-execution values of the registry key and the sub-keys, a process of the registry call, an indication of a user, and a timestamp, wherein the pre-execution state of the registry call includes pre-execution values of the registry key and the sub-keys including at least one of: stored values of the registry key and the sub-keys in a fast registry cache (FRC), stored values of the registry key and the sub-keys in a local persistent registry cache (PRC), or original values of the registry key and the sub-keys in the system; storing the registry call information in the FRC and in the PRC, wherein the PRC further stores advanced registry information including historical registry call information; pushing the registry call information from the FRC to an EDR engine based on a predefined policy; receiving from the EDR engine, a request to provide the advanced registry information to configure a remediation action, wherein the request is based on an incident including a registry change; and providing, to the EDR engine, the advanced registry information stored in PRC in response to the request.

BRIEF DESCRIPTION OF THE DRAWINGS

Subject matter hereof may be more completely understood in consideration of the following detailed description of various embodiments in connection with the accompanying figures, in which.

Figure 1:
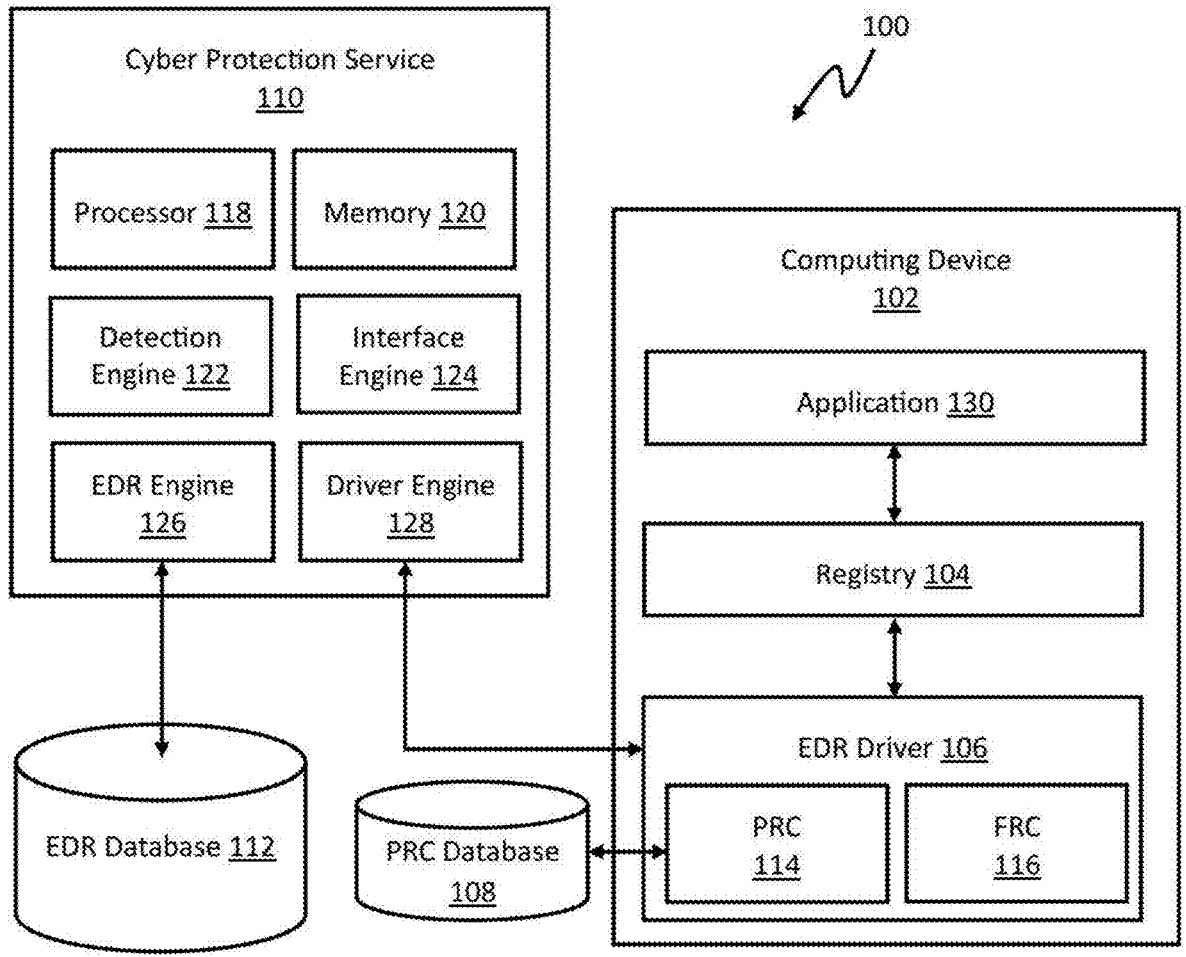
FIG. 1 is a block diagram of a system for capturing and managing registry changes, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Systems and methods for management of registry data within a computing environment are described and contemplated herein. A fast registry cache and a persistent registry cache can be used to manage different aspects of the registry call information. The registry call can be integrated with endpoint detection and response (EDR) system support.

Embodiments of the present disclosure address technical challenges related to the management of registry data within a computing environment, especially in contexts requiring security and rapid response capabilities, such as incident remediation. Embodiments can improve performance efficiency, provide real-time data handling, and increase data integrity and accessibility.

Referring to FIG. 1, a block diagram of system 100 for capturing and managing registry changes is depicted, according to an embodiment. System 100 generally comprises a computing device 102, a registry 104, an EDR driver 106, a PRC database 108, a cyber protection service 110, and an EDR database 112.

Computing device 102 comprises an electronic device in communication with system 100. In particular, system 100 can manage changes to registry 104 initiated by an application 130 on computing device 102. In an example, computing device 102 can be desktop computer, a laptop computer, tablet, mobile computing device, server, workstation, or Internet-of-things (IoT) device, among other electronic devices. Though depicted as protecting a single computing device, system 100 can, in other embodiments, include a plurality of computing devices 102, such as a networked system of devices. In embodiments, computing device 102 can be utilized by a user to interact with other components of system 100, such as cyber protection service 104, for example to configure remediation actions (not shown).

Registry 104 comprises a centralized repository, for example a hierarchical database. Registry 104 can control the configuration and operation of computing device 102. For example, registry 104 can be used by operating systems of computing device 102 to store configuration settings and options for the operating system, applications (e.g., application 130), and user preferences. The centralization of registry 104 ensures consistency and allows for efficient retrieval and modification of configuration data but can introduce significant security concerns if accessed by a malicious actor.

In an embodiment, registry 104 is a hierarchical database that organizes information into a structure comprising keys, subkeys, and entries. Registry 104 can be organized into keys, which act as containers for related configuration settings, and subkeys, which are nested within keys to further organize settings. In some implementations, keys are analogous to folders in a file system, providing a hierarchical structure for organizing configuration data. For example, some keys can be defined for settings related to installed software, while other keys can be defined for system settings. Entries store individual configuration settings, for example, within each key or subkey. In some implementations, entries can comprise a name/value pair, where the name is a unique identifier for the setting, and the value is the actual data associated with the setting. Values can store various types of data, including strings, integers, binary data, and multi-string values, depending on the type of configuration setting.

In embodiments, access to the registry can be controlled by the operating system's security mechanisms, with permissions assigned to users and groups to regulate who can view or modify specific registry keys and entries. Applications and system processes also access the registry programmatically to retrieve and update configuration settings as needed. For example, a user of computing device 102 can interact with registry 104 through application 130. Application 130 can be a built-in utility such as a registry editor or command-line tools.

Computing device 102 generally includes EDR driver 106. EDR driver 106 is configured to implement endpoint detection and response to threats and suspicious activities on an endpoint device (e.g., computing device 102).

In an embodiment, EDR driver 106 is an agent deployed on computing device 102 to monitor and analyze system activities in real-time. EDR driver 106 operates at a foundational level within the operating system, allowing it to capture and interpret events, processes, network connections, file operations, and other activities occurring on computing device 102. For example, EDR driver 106 is configured to monitor operations and functions that interact directly with hardware resources of computing device 102, such as registry 104. In one aspect, EDR driver 106 is a software component that is implemented by a set of instructions stored in memory. In one aspect, EDR driver 106 comprises a system file or set of system files.

In an embodiment, EDR driver 106 is a device driver configured to communicate through a computer bus or communication subsystem connected to hardware of computing device 102. In such embodiments, EDR driver 106 can be hardware dependent and operating-system specific. For example, EDR driver 106 can provide abstraction by acting as a translator between computing device 102 and higher-level applications. The presence of EDR driver 106 between the hardware and application levels can allow for more granular monitoring and control of system activities, providing a higher level of security and responsiveness. For example, EDR driver 106 can implement kernel-level file system hooks, network stack integration, and memory scanners.

In an embodiment, EDR driver 106 is a software driver configured to provide a programming interface to control and manage specific lower-level interfaces that are often linked to a specific type of hardware, or other low-level service. A software-level EDR driver 106 can operate at a higher level than kernel-level implementations, focusing on integrating with the operating system through APIs and user-space processes. By focusing on user-space and leveraging existing OS APIs and libraries, software-level EDR drivers provide a flexible and less complex approach to endpoint security compared to kernel-level implementations.

EDR driver 106 is configured to capture data, according to embodiments. In an embodiment, EDR driver 106 monitors telemetry data from computing device 102, for example, including system logs, registry changes, file modifications, network traffic, and other relevant information. EDR driver 106 can send captured data to cyber protection service 110.

EDR driver 106 integrates one or more caching mechanisms to store and manage obtained data related to endpoint security, according to embodiments. A cache can be a hardware or a software component that stores frequently accessed or recently used data in a location that is easily accessible. The use of a cache reduces the time and resources required to access relevant data by storing a copy of the data closer to the point of use. For example, data cached by EDR driver 106 can include whitelisted applications and baseline system configurations.

In an embodiment, EDR driver 106 comprises PRC 114 and FRC 116. EDR driver 106 can organize data cached by PRC 114 and FRC 116 to allow for quick access and retrieval when needed for threat detection and response operations.

PRC 114 extends the benefits of caching by storing registry data persistently across system restarts, ensuring that frequently accessed data remains available even after a reboot. In an embodiment, PRC 114 retains data, such as known malware signatures, behavioral patterns, and historical telemetry data. Retention of cached data across reboots reduces the need to reacquire frequently accessed registry data from disk. PRC 114 allows for continuous protection and threat detection, for example by cyber protection service 110, even in offline or disconnected environments.

PRC 114 can be communicatively coupled to PRC database 108. PRC database 108 is a data store or other storage mechanism configured to store cached registry data associated with PRC 114 persistently across system restarts or shutdowns. For example, PRC database 108 can be configured to retain registry data even when computing device 102 is powered off or restarted.

In an embodiment, PRC database 108 is a database, logical disk space, file, or other suitable storage medium configured to store data associated with PRC 114. In an embodiment, PRC database 108 can be a general-purpose database management storage system (DBMS) or relational DBMS as implemented by, for example, ORACLE, IBM DB2, Microsoft SQL Server, PostgreSQL, MySQL, SQLite, LINUX, or UNIX solutions.

In operation, PRC 114 ensures a consistent and personalized user experience by retaining user-specific registry settings across system restarts, such as desktop preferences or application configurations. Moreover, storing critical system configuration settings in PRC 114 can improve system stability by ensuring that essential parameters remain readily accessible, even in the event of unexpected system failures or power outages.

FRC 116 extends the benefits of caching by enhancing the performance of registry operations by storing frequently accessed registry data in a high-speed storage medium (e.g., cache). In an embodiment, FRC 116 reduces the time required to retrieve configuration settings, leading to faster system startup, application launch, and overall system responsiveness.

In operation, by minimizing the need to access the registry on disk, FRC 116 reduces disk I/O operations, which can help improve overall system performance, particularly on systems with slower storage devices. Caching application-related registry settings can speed up the launch of frequently used applications by reducing the time needed to retrieve configuration data from the registry.

With continued reference to FIG. 1, cyber protection service 110 is configured to act as a backend infrastructure (e.g., management console or server-side component) of the EDR solution to facilitate centralized management and orchestration of security operations, according to embodiments. For example, registry changes captured by EDR driver 106 can be obtained (e.g., requested/received) by cyber protection service 110 to identify potential security threats and suspicious behavior.

Cyber protection service 110 generally comprises processor 118, memory 120, detection engine 122, interface engine 124, EDR engine 126, and driver engine 128. Cyber protection service 110 provides capabilities to identify indicators of compromise (IOCs) and potential security incidents, according to embodiments. In examples, cyber protection service 110 is configured to employ various detection techniques, such as signature-based detection, behavioral analysis, machine learning algorithms, and threat intelligence feeds. For example, cyber protection service 110 can monitor endpoint activities to determine and recognize patterns indicative of malicious behavior, unauthorized access, malware infections, data exfiltration, lateral movement, and other security threats. In addition to detection capabilities, cyber protection service 110 facilitates response actions to mitigate security incidents and contain threats on the endpoint (e.g., computing device 102).

In an embodiment, response actions initiated by cyber protection service 110 include isolating the endpoint from the network, terminating malicious processes, quarantining files, rolling back system changes, or alerting security operations personnel for further investigation and remediation. Response actions can be determined by cyber protection service 100 based on the severity of a threat and/or an organization's security policies.

In an embodiment, as illustrated in FIG. 1, cyber protection service 110 is implemented on a single device, such as a server, having its own processor and memory. In embodiments, cyber protection service 110 can be a cloud-based service such that detection and resolution of security incidents can be distributed across a network of multiple computing devices (e.g., with each device having its own processor and memory).

Embodiments described herein include various engines, each of which is constructed, programmed, configured, or otherwise adapted, to autonomously carry out a function or set of functions. The term engine as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware.

An engine can itself be composed of sub-engines, each of which can be regarded as an engine in its own right. Moreover, in the embodiments described herein, each of the various engines corresponds to a defined functionality; however, it should be understood that in other contemplated embodiments, each functionality can be distributed to more than one engine.

Likewise, in other contemplated embodiments, multiple defined functionalities can be implemented by a single engine that performs those multiple functions, possibly alongside other functions, or distributed differently among a set of engines than specifically illustrated in the examples herein. In one example, the engines described herein are executed by a processor (e.g. an ASIC) according to instructions stored on memory operably coupled to the processor.

Detection engine 122 is configured to process event data to identify potential security threats and suspicious activities on computing device 102, for example, based on data received from EDR driver 106. In an embodiment, detection engine 122 can receive event data indicative of various activities of computing device 102, including process executions, registry modifications, network connections, system configuration changes, and user interactions (e.g., from driver engine 128 and/or EDR engine 126). Event data can include telemetry data, such as logs, event records, system calls, network traffic, registry changes, and the like.

In an embodiment, detection engine 122 is configured to recognize and interpret behavioral patterns and activity sequences to identify normal activity (e.g., baseline system behavior) and deviations that may indicate potential security threats. Behavioral analysis by detection engine 122 can involve machine learning algorithms, statistical models, and heuristics to detect suspicious or anomalous behavior. By analyzing relationships between different events and entities, detection engine 122 allows for complex attack scenarios, lateral movement, and persistent threats to be identified.

In an embodiment, detection techniques leveraged by detection engine 122 to identify anomalies can include, for example, signature-based detection, anomaly detection, behavior-based detection, threat intelligence feeds, and correlation of multiple events.

In an embodiment, detection engine 122 is configured to notify EDR engine 126 on anomalous event detection. For example, when suspicious activities are detected, detection engine 122 can generate an alert and indicator to notify EDR engine 126 and/or security operations personnel (e.g., via interface engine 124). In examples, alerts can include details about the detected activity, severity level, affected endpoint, and recommended response actions. In examples, a verdict on event data by detection engine 122 can be requested by EDR engine 126, facilitating rapid incident response and remediation.

In an embodiment, interface engine 124 integrates with other systems, applications, and databases to access data, trigger events, and exchange information. For example, interface engine 124 is configured to correlate data monitoring and capture between endpoints, such as computing device 102. For example, interface engine 124 can dynamically manage event data associated with a first endpoint from event data at a second endpoint. Correlations, associations, and links between cross-system data can be defined by a user, for example via interface engine 124, or automatically determined. For example, if an anomalous event is determined to have occurred at a first endpoint (e.g., by detection engine 122), interface engine 124 can be used to implement a security protocol or update at a second endpoint, for example based on an association between the endpoints.

In an embodiment, interface engine 124 supports definition of custom remediation actions based on security event detection. For example, interface engine 124 is configured to receive user input regarding differentiation between retrieval and modification of registry keys based on their states before and after execution. Interface engine 124 can include graphical or text-based interfaces for interacting with cyber protection service 110. In an embodiment, interface engine 124 generates monitoring dashboards (e.g., reporting tools and analytics capabilities) to track the performance, efficiency, and compliance of cyber protection service 110.

In an embodiment, interface engine 124 allows a user, for example a user of computing device 102, to enhance pattern recognition by providing access to EDR database 112. For example, interface engine 124 can facilitate declaration of custom security event schema with unique properties and declaration of links (e.g., associations) between custom security properties and properties of cyber protection service 110.

Interface engine 124 allows for an added layer of customization and security to cyber protection service 110. For example, detection methodology employed by detection engine 122 can be refined by adjusting detection rules, thresholds, and policies to optimize detection accuracy, minimize false positives, and prioritize critical alerts.

In an embodiment, interface engine 124 can support dynamic security and access control to cyber protection service 110. Interface engine 124 can incorporate security policies, authentication mechanisms, and access controls to protect sensitive data. Role-based security (e.g., based on user profiles), encryption, audit trails, and data privacy measures can be implemented according to embodiments. In such embodiments, EDR database 112 can be enriched to consider a profile of a user (e.g., a user of computing device 102) and/or a control level. For example, interface engine 124 can implement administrative actions that are associated with an elevated access level. Accordingly, security components, for example as stored in EDR database 112, can be classified based on third-party security considerations.

EDR engine 126 is configured to process event data, for example by serving as an event manager that maintains the state and progress of event data. In an embodiment, EDR engine 126 tracks the status, history, and metadata associated with incoming event data, requests determinations on the event data from detection engine 122, and/or provides the event data to EDR database 112, allowing for real-time monitoring, reporting, and analysis. In such an embodiment, based on response(s) from detection engine 122 and/or EDR database 112, EDR engine 126 can determine whether a response action is justified. For example, detected threats can be correlated with response actions, such as quarantine, isolation, remediation, or escalation for further investigation.

EDR database 112 comprises one or more storage repositories, such as a database, logical disk space, file, or other suitable storage medium configured to store workflow elements. In an embodiment of a database, EDR database 112 can be a general-purpose database management storage system (DBMS) or relational DBMS. In an embodiment, EDR database 112 can be integrated with cyber protection service 110. For example, EDR database 112 can be stored in memory 120.

Driver engine 128 is configured to implement policies for EDR storage in a performant manner. For example, driver engine 128 is configured to capture registry changes in real-time, using, for example, PRC 114 and/or FRC 116. Driver engine 128 can manage provision of registry changes throughout cyber protection service 110 to identify vulnerabilities, detect malware, assess security risks in endpoints (e.g., computing device 102), and implement response actions.

In an embodiment, driver engine 128 applies artificial intelligence (e.g., machine learning), to identify and mitigate security threats. For example, driver engine 128 can monitor the implementation of a response action and log the details to improve system 100 effectiveness. Refinement (e.g., iterative refinement) of process metrics of detection engine 122 and response actions implemented by driver engine 128 can allow for automated improvement and optimization of cyber protection service 110, according to an embodiment.

In an embodiment, event data associated with an anomalous event and/or an implementation of a response action can be stored or updated in EDR database 112 by driver engine 128 (e.g., via EDR engine 126) such that statistics can be gathered for later monitoring and updating purposes. For example, if a response action is not helpful or inadequate (e.g., marked as such by a user), the response action can be modified or removed from EDR database 112. For example, if an anomalous event is determined to be malicious, the event data can be stored in EDR database 112 as indicative of malicious activity.

In another example, reinforcement learning can be used to implement a reinforcement learning model where driver engine 128 determines whether registry calls of prior activity were effective based on rewards received for accessing caches efficiently. Over time, the model can optimize registry filtration and access for various scenarios and properties, effectively learning from past actions. For example, driver engine 128 can instruct EDR driver 106 to query FRC 116 rather than making expensive calls to registry 104.

Generally, in operation of system 100, cyber protection service 110 is used with PRC 114 and FRC 116 via EDR driver 106 to efficiently obtain, store, interpret, and/or respond to registry changes of computing device 102. For example, incorporation of FRC 116 to intercept (e.g., all) registry calls, store updated values in memory, can provide event data (e.g., pertaining to the registry calls and updated values) to cyber protection service 110, allows for a superposition of the reporting values (e.g., the ability of the reporting values to be in multiple states at the same time until the reporting values are measured). For example, incorporation of PRC 114 to store a full cache of registry changes that can be used for remediation allows for quick and efficient response to requests from cyber protection service 110 to recover registry keys/values.

In a first aspect, FRC 116 provides fast access to recently changed/retrieved registry keys/values. EDR driver 106 can query FRC 116 to avoid making expensive registry calls. Remediation can be performed by using a full set of registry keys/values, stored in the EDR database 112.

In a second aspect, EDR driver 106 can filter the registry 104 (e.g., a kernel registry) to store a persistent cache of registry changes that can be used for remediation via PRC 114. In embodiments, FRC 116 is also available, for example to send a complete registry set to cyber protection service 110. Incorporation of a dual cache allows for redundancy (e.g., through PRC 114) while facilitating efficient communication (e.g., through FRC 116) and storage of the complete registry set to EDR database 112. For example, PRC 114 can be used (e.g., only) for detection related events and not to send a complete registry set to cyber protection service 110, increasing efficiency without sacrificing data persistence.

Figure 2:
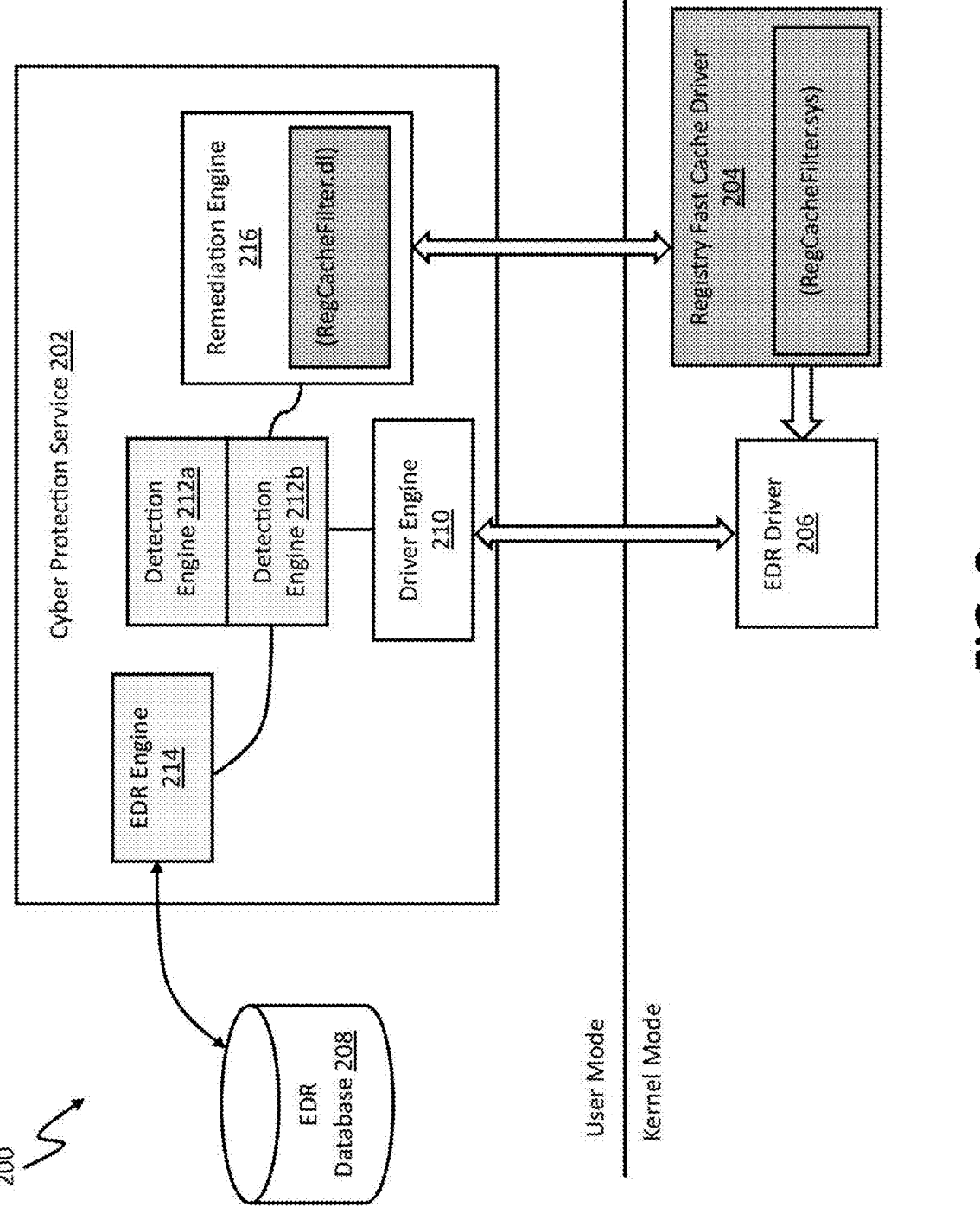
FIG. 2 is a block diagram of a system for capturing and managing registry changes, according to an embodiment.

Referring to FIG. 2, a block diagram of system 200 for capturing and managing registry changes is depicted, according to an embodiment. In an embodiment, system 200 includes many of the same components as system 100, but which are renumbered in FIG. 2 for ease of discussion. System 200 generally comprises a cyber protection service 202, a registry fast cache driver 204, an EDR driver 206, and an EDR database 208.

Cyber protection service 202 generally comprises a driver engine 210, detection engine(s) 212*a*, 212*b*, an EDR engine 214, and a remediation engine 216. In an embodiment, cyber protection service 202 is substantially the same as cyber protection service 110.

Driver engine 210 is a driver manager configured to support EDR service workflow and execution of cyber protection service 202 (e.g., by instructing EDR driver 206). In an embodiment, driver engine 210 can obtain event data indicative of changed/retrieved registry keys/values from EDR driver 206.

Detection engines 212*a*, 212*b* are components of cyber protection service 202 configured to process event data to detect an anomalous event. In an embodiment, detection engines 212*a*, 212*b* can receive and interpret event data from driver engine 210. In an embodiment, detection engines 212*a*, 212*b* can incorporate AI to refine anomalous event detection capabilities.

In an embodiment, detection engine 214*a* can be a scanning and rules engine configured to, for example, perform network security scanning and/or web application scanning. In some implementations, detection engine 214*a* can conduct comprehensive scans of network infrastructure (e.g., routers, switches, firewalls, and servers) to identify vulnerabilities, misconfigurations, and potential security risks. In some implementations, detection engine 214*a* can assess the security posture of web applications by scanning for common vulnerabilities, such as SQL injection, cross-site scripting (XSS), and insecure authentication mechanisms.

In an embodiment, detection engine 212*b* can be a behavior analysis engine configured to analyze the behavior of software and systems to detect abnormal or suspicious activities that may indicate the presence of malware or security breaches. For example, detection engine 212*b* can recognize malicious patterns of behavior indicative of predefined malware.

Remediation engine 216 is a remediation controller configured to implement response actions. For example, remediation engine 216 facilitates response actions to mitigate security incidents and contain threats on the endpoint. Depending on the severity of the threat and the organization's security policies, response actions may include isolating the endpoint from the network, terminating malicious processes, quarantining files, rolling back system changes, and/or alerting security operations personnel for further investigation and remediation.

In an embodiment, remediation engine 216 is configured to perform filtering capabilities. For example, remediation engine 216 can filter registry data based on certain criteria, such as access patterns, registry keys, or data types, to optimize caching efficiency or prioritize certain registry entries for caching.

In some implementations, such as that illustrated in FIG. 2, remediation engine 216 can include a dynamic link library file (DLL), for example a RegCacheFilter.dll file. The DLL file can include instructions associated with managing the cache of registry data, including storing, retrieving, updating, and evicting cached entries based on usage patterns, available resources, and configuration settings.

Registry fast cache driver 204 is configured to provide fast access to recently changed/retrieved registry keys/values. For example, registry fast cache driver 204 can provide registry changes to EDR driver 206 so that EDR driver 206 can avoid making comparatively expensive registry calls.

In an embodiment, fast registry cache driver 204 intercepts all registry calls, and stores updated values in memory. Fast registry cache driver 204 can provide this info to EDR driver 206, making a superposition of the reporting values.

In some implementations, the fast registry cache driver can be integrated with a registry proof of concept (PoC) driver. A registry PoC driver can be used, for example, when incorporating AI-based recommendations or security analysis.

In some implementations, such as that shown in FIG. 2, registry fast cache driver can be associated with a system file, for example, a RegCacheFilter.sys file. The system file can operate at the kernel level of the operating system, allowing the system file to interact directly with system resources and perform privileged operations related to registry caching. For example, the system file can be a system driver component designed to filter and manage the caching of registry data in operating systems.

EDR driver 206 is configured to communicate with cyber protection service 202, for example, to report telemetry data, receive commands, and facilitate centralized management and orchestration of security operations. In an embodiment, EDR driver 206 is configured to provide driver engine 210 with registry changes (e.g., a complete set of registry changes). In some implementations, EDR driver 206 can be a next generation scan (NGS) driver.

In an embodiment, EDR database 208 is a remote data store (e.g., with the same functionality as EDR database 112) configured to be propagated with a complete registry set from EDR driver 206 via cyber protection service 202.

With reference to FIG. 2, operation of system 200 is described with respect to an example method for creating a custom trigger based on a custom event.

In an embodiment, an EDR rollback process by cyber protection service 202 can involve reverting changes made to the registry of an endpoint device to a previous, known good state using data stored in EDR database 208 as facilitated by EDR engine 214. For example, EDR engine 214 maintains EDR database 208 to store historical event data, including snapshots of the registry at different points in time. For example, EDR database 208 can contain metadata, registry snapshots, and other forensic data collected from endpoint devices, enabling historical analysis and incident response.

The EDR rollback process can be initiated by detection and analysis of a security incident. Detection engine 212*b* of cyber protection service 202 can detect a security incident or suspicious activity on an endpoint device, for example involving registry modifications, components of cyber protection service 202 can assess the impact of the detected security incident, and remediation engine 216 can determine appropriate response action(s). For example, a rollback process may be initiated to revert the registry to a clean state if the detected security incident involves unauthorized registry changes or malware compromising the registry.

In an embodiment, the EDR rollback process can be initiated automatically by cyber protection service 202, for example based on an automated response workflow. In an embodiment, the EDR rollback process can be initiated by security operations personnel, for example through an EDR management interface provided by an interface engine. The rollback request can specify the endpoint device and the desired point in time to which the registry should be reverted.

The EDR rollback process comprises EDR engine 214 retrieving, from EDR database 208, the appropriate registry snapshot corresponding to the requested rollback point. Registry snapshots can capture the state of the registry at specific timestamps, allowing for precise rollback to a known good configuration.

The EDR rollback process comprises remediation engine 216 pushing the registry snapshot to the affected endpoint device and initiating the rollback process. For example, remediation engine 216 can push the registry snapshot to registry fast cache driver 204. Registry changes made after the selected rollback point are reverted, restoring the registry fast cache driver to a previous state (e.g., before the security incident occurred).

Post-incident remediation tasks, such as applying security patches, updating antivirus signatures, or implementing security controls to prevent similar incidents in the future can be performed following the EDR rollback process. In embodiments, post-incident remediation tasks comprise refinement of the EDR rollback process, for example, using machine learning (e.g., a dynamic feedback loop).

By maintaining and leveraging data stored in an EDR database 208, cyber protection service 202 can effectively roll back registry changes on endpoint devices to mitigate the impact of security incidents, restore system integrity, and strengthen their overall cybersecurity posture.

Incorporation of registry fast cache driver 204 into system 200 offers significant performance, reliability, and security benefits, enhancing the resilience of system 200 and minimizing the impact of data loss or system downtime. For example, registry fast cache driver 204 reduces the time required to maintain a backup of changes to the system registry by storing frequently accessed data in a high-speed cache. By minimizing disk I/O operations and latency, fast caching accelerates the communication process with cyber protection service 202.

In an embodiment, registry fast cache driver 204 reduces overhead of system 200 by alleviating the performance impact of registry backups on system resources, such as CPU, memory, and disk bandwidth. By offloading repetitive read operations from slower storage devices to the cache, system overhead is reduced, allowing other processes to run more efficiently.

In an embodiment, registry fast cache driver 204 improves reliability of system 200. Fast caching mechanisms can provide redundancy and fault tolerance, ensuring reliable storage of backup data in case of system failures or data corruption. By maintaining multiple copies of the registry backup in the cache (e.g., using dual cache including a persistent registry cash driver), the risk of data loss due to hardware failures or accidental deletion is minimized.

Cyber protection service 202 incorporating fast caching solutions can scale to accommodate growing volumes of registry data and backup requirements, providing flexibility to adapt to changing business needs and system configurations.

Figure 3:
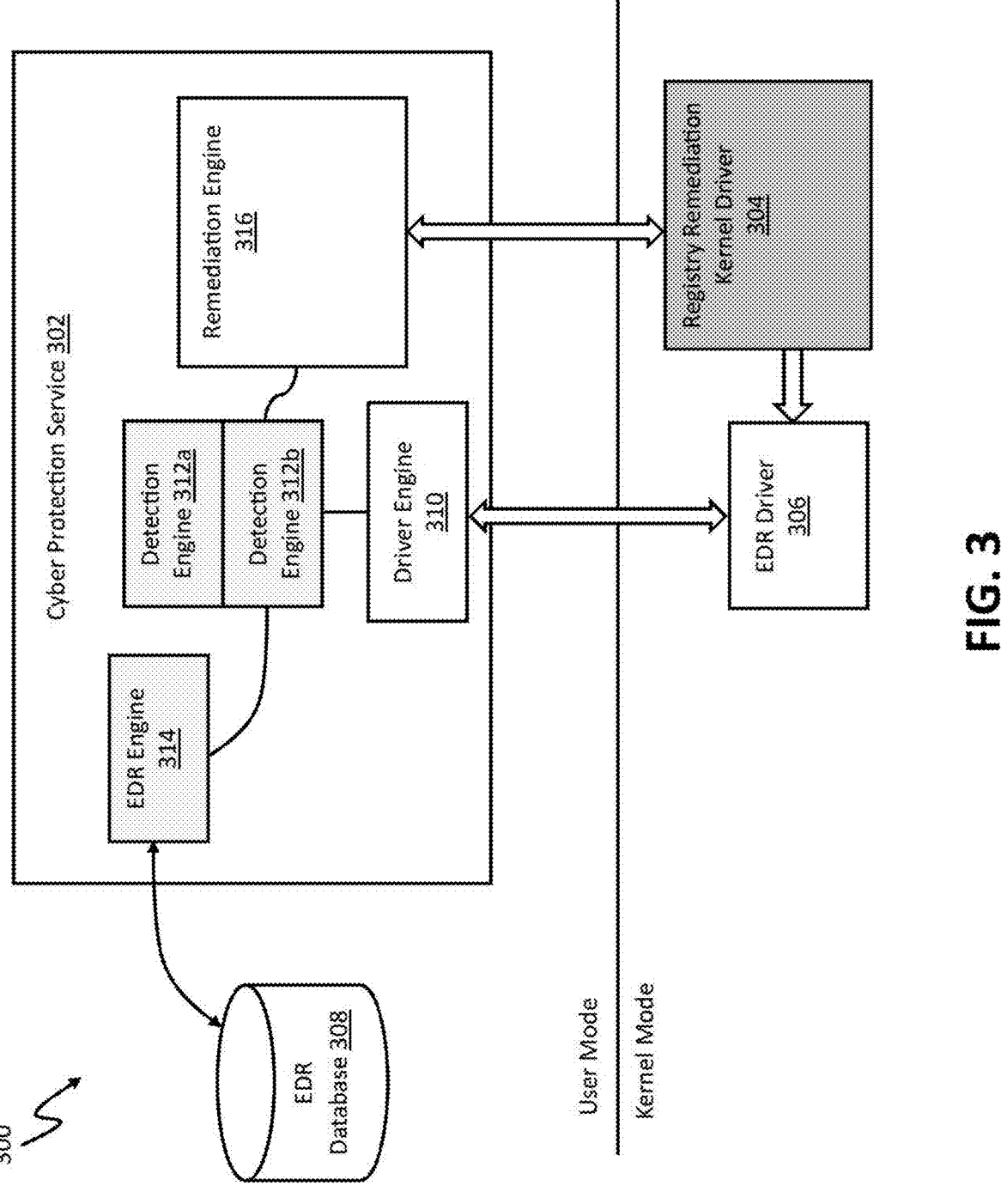
FIG. 3 is a block diagram of a system for capturing and managing registry changes, according to an embodiment.

Referring to FIG. 3, a block diagram of system 300 for capturing and managing registry changes is depicted, according to an embodiment. In an embodiment, system 300 includes many of the same components as system 100 and system 200, but which are renumbered in FIG. 3 for ease of discussion. System 300 generally comprises a cyber protection service 302, a registry remediation kernel driver 304, an EDR driver 306, and an EDR database 308.

Cyber protection service 302 can include driver engine 310, detection engine(s) 312*a*, 312*b*, EDR engine 314, and remediation engine 316.

In an embodiment, registry remediation kernel driver 304 is configured to implement a dual cache—a full persistent registry cash and a fast registry cache. In some implementations, registry remediation kernel driver 304 is a kernel registry filtering driver that stores the persistent cache of registry changes that can be used for remediation, while simultaneously having a fast registry cache available. In such implementations, the persistent registry cache can be used for detection related events while the fast registry cache can be used to send the complete registry set to EDR database 308.

In an embodiment, a fact cache registry driver of registry remediation kernel driver 304 is configured to intercept all registry calls, and store updated values in memory. The fact cache registry driver can provide this info to driver engine 310, allowing for the population of EDR database 308 (e.g., via EDR engine 314).

In an embodiment, a full persistent cache registry driver of registry remediation kernel driver 304 is configured to intercept all registry calls, and store updated values in memory in a persistent manner. The full persistent cache registry can satisfy requests (e.g., from EDR driver 306) to recover registry keys/values, Referring to FIG. 4, a block diagram of system 400 for capturing and managing registry changes is depicted, according to an embodiment. In an embodiment, system 400 includes many of the same components as system 100, 200, and/or 300 as depicted in FIGS. 1-3.

In an embodiment, system 400 allows for redundancy of registry data through incorporation of dual caching. The use of both a FRC and a PRC to manage different aspects of the data lifecycle provides for the technical improvements to performance efficiency, real-time data handling, data integrity and accessibility, and complexity in remediation and enhancement of security, among others. For example, the FRC provides quick access to recently retrieved or modified registry keys/values for immediate response needs, while the PRC handles longer-term storage and complex data sets necessary for thorough incident analysis and remediation planning. Moreover, implementing dual caches at the kernel mode allows for high-speed data processing and reduces the latency typically associated with user-mode interventions, enhancing overall system performance and security posture.

Figure 4:
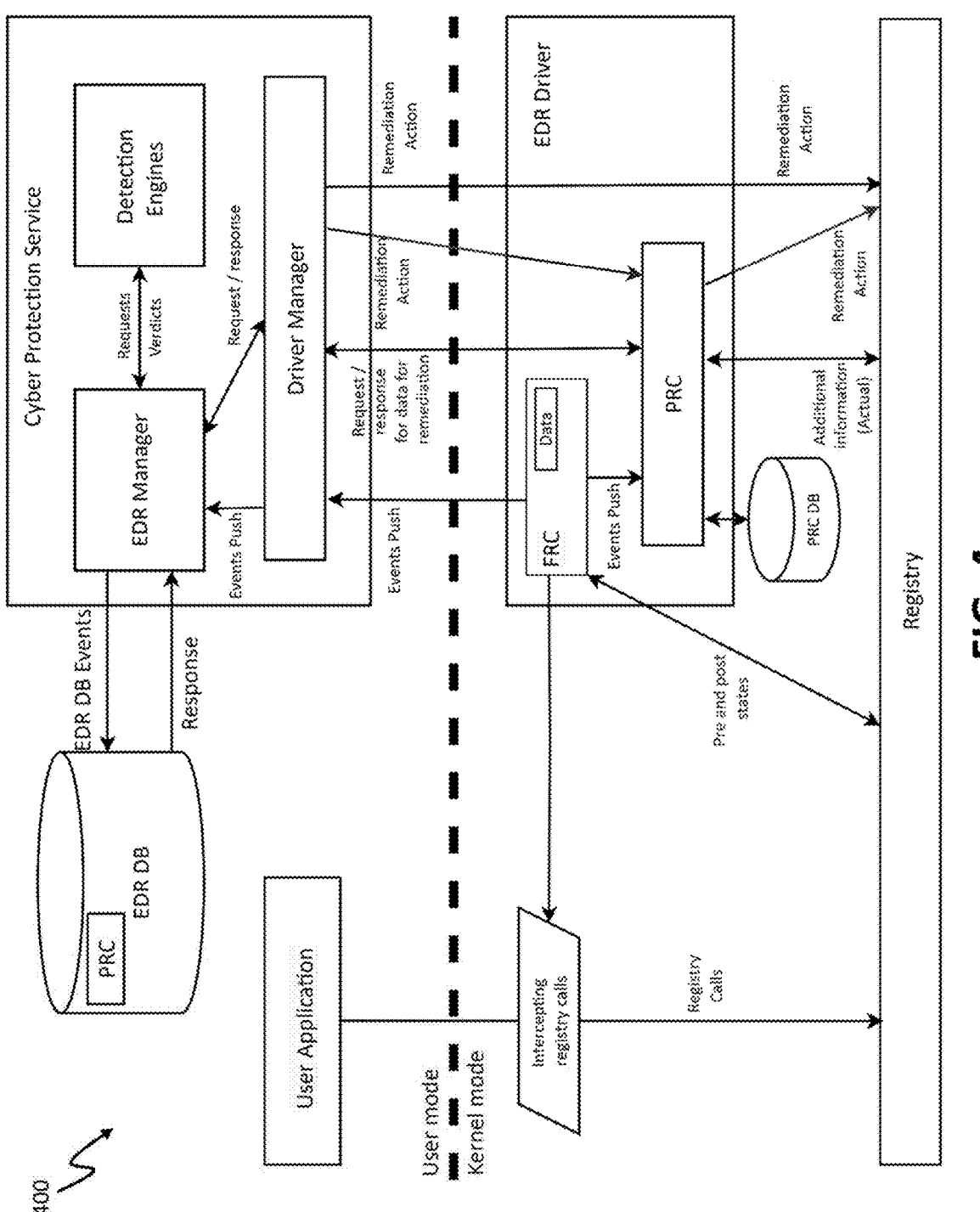
FIG. 4 is a process flow diagram of a method of capturing and managing registry changes, according to an embodiment.

As illustrated in FIG. 4, a cyber protection service can provide direct remediation actions to the registry, for example, without reliance on the EDR driver. Provision of direct remediation is facilitated by FRC pushing event data to the cyber protection service in an efficient manner (e.g., compared to PRC), which allows the EDR database to maintain a remote PRC. In embodiments, FRC can proactively intercept registry calls from a user application, allowing for quicker provision to cyber protection service. In some cases, provision of registry calls by FRC can facilitate streamlined implementation of remediation actions, such as an EDR rollback by the cyber protection service. In network connected devices, the time saved from proactive provision of event data (e.g., changes to registry entries/values) can mitigate the spread of malware across the network.

In an embodiment, provision of historical changes to the registry by the EDR driver to the driver manager facilitates advanced investigation, for example into data associated with the actor. Historical changes to the registry can also be used for rollback, such as for rollback from a remote EDR database. The capability of the cyber protection service to analyze registry calls based on both pre- and post-execution states, along with a comparison to stored historical data, provides an advanced mechanism for determining the nature of registry changes and the appropriate response strategies.

In an embodiment, FRC can reside in a cloud service.

In an embodiment, integration of a dual cache EDR driver with the cyber protection service, as illustrated in FIG. 4, allows for seamless and automated pushing of relevant registry changes based on predefined policies, enabling proactive responses to detected anomalies or potential threats.

Figure 5:
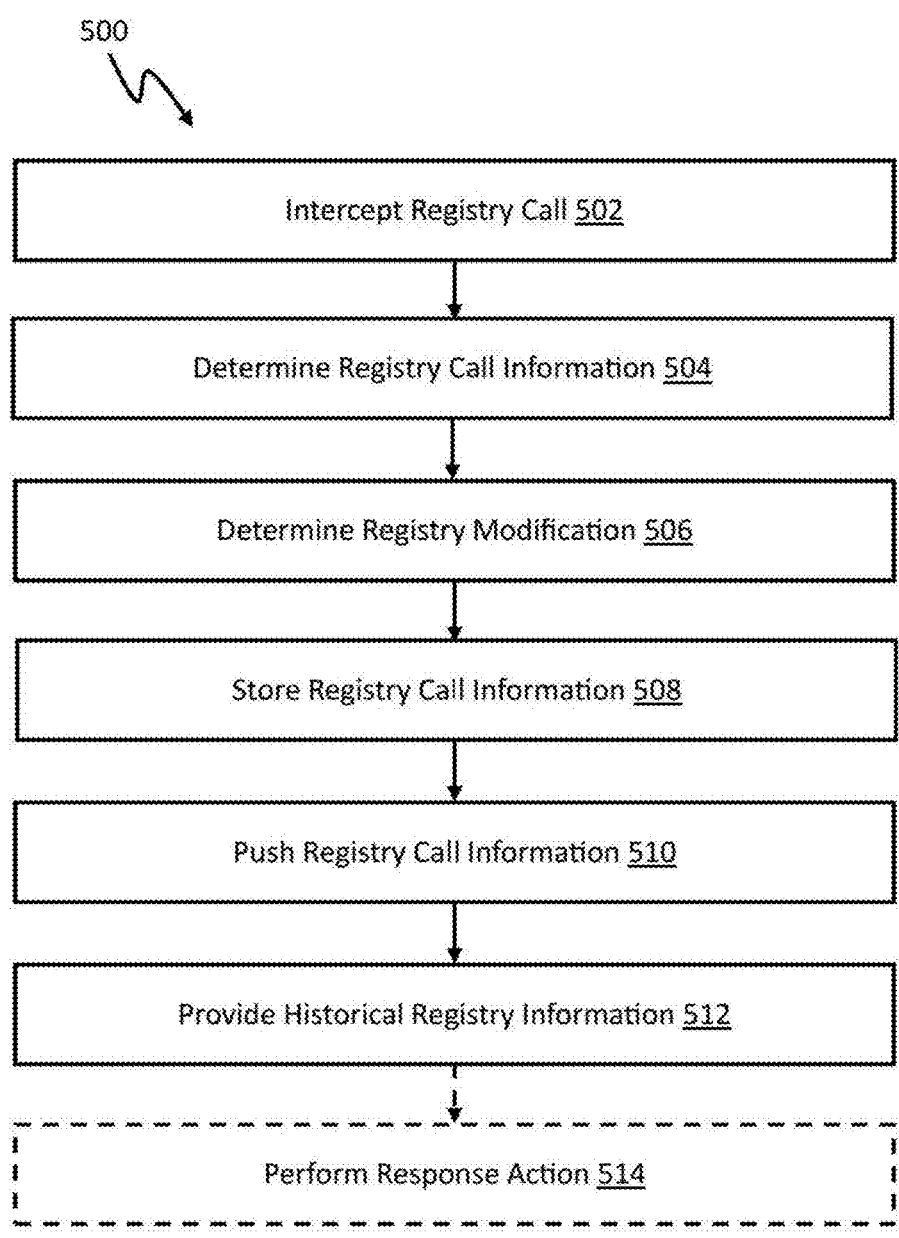
FIG. 5 is a flowchart of a method for capturing and managing registry changes for efficient remediation purposes, according to an embodiment.

Referring to FIG. 5, a flowchart of a method 500 of capturing and managing registry changes is depicted, according to an embodiment. In an embodiment, method 500 can be implemented by system 100, 200, 300, and/or 400 as depicted in FIGS. 1-4. Reference will be made to system 100 for ease of discussion.

At 502, method 500 comprises intercepting a registry call. In an embodiment, EDR driver 106 can intercept a registry call made by application 130. EDR driver 106 can be a kernel-mode driver that is configured to intercept registry calls at a kernel mode of computing device 102. Intercepted system calls can comprise registry operations, such as reading, writing, or deleting registry keys and values. Interception can include storing (e.g., logging) registry operations, modifying registry operations, or blocking certain operations based on predefined criteria.

At 504, method 500 comprises determining registry call information. Registry call information can include, for example, one or more of registry keys and their associated values, types of registry calls (e.g., read, write, or delete operations), registry API functions, kernel-mode registry operations, registry callback mechanism, or impacts of the registry call on system performance. In an embodiment, EDR driver 106 can identify registry call information associated with an intercepted registry call.

In an embodiment, identified registry call information can comprise registry key(s) and their associated values (e.g., the registry key(s) and value(s) implicated by the registry call). For example, a registry call may modify a value associated with a registry key. For example, a registry call can retrieve a value associated with a registry key.

In an embodiment, identified registry call information can comprise an execution status associated with the registry call (e.g., whether the registry call has been executed).

At 506, method 500 comprises determining registry modification occurred. In an embodiment, EDR driver 106 determines whether a value associated with a key has been modified by a registry call (e.g., an intercepted registry call). In examples, a determination of whether the associated value of the registry key was modified by the registry call can be based on a comparison between a post-execution state of the registry call and a pre-execution state of the registry call. For example, a determination that the associated value of the registry key was modified can be a determination that a post-execution state of the registry call is not equal to a pre-execution state of the registry call. For example, a determination that the associated value of the registry key was retrieved (e.g., or otherwise not modified) can be a determination that a post-execution state of the registry call is equal to a pre-execution state of the registry call.

In an embodiment, the pre-execution state of the registry call is based on a stored value of the registry key in FRC 116 and a stored value of the registry key in PRC 114. For example, the pre-execution state of the registry call can be based on a dual cache mechanism (e.g., as illustrated in FIG. 1).

In an embodiment, a determination that the associated value of the registry key was modified by the registry call is based on a post-execution state of the registry call not being equal to a pre-execution state of the registry call where the pre-execution state of the registry call is based on a stored value of the registry key in FRC 116.

In an embodiment, the pre-execution state of the registry call is based on an original value of the registry key in computing device 102. In such an embodiment, the determination that the associated value of the registry key was modified by the registry call comprises a determination that the post-execution state of the registry call is not equal to the pre-execution state of the registry call (e.g., where the pre-execution state of the registry call is based on the original value of the registry key in the system).

At 508, method 500 comprises storing registry call information. In an embodiment, EDR driver 106 stores registry call information in PRC 114 and FRC 116.

In an embodiment, EDR driver 106 stores advanced registry call information in PRC 114. Advanced registry call information can include, for example, one or more of historical registry change(s), an actor associated with a (e.g., each) registry change, or a timestamp associated with a (e.g., each) registry change. Storing advanced registry call information, such as historical registry changes, can be important for advanced investigation (e.g., actor data) and for rollback (e.g., to a previous registry state). In examples, EDR driver 106 only stores advanced registry call information in PRC 114, for example, such that storage of registry information in FRC 116 is limited to registry call information associated with the intercepted registry call (e.g., a most recent registry call, or a number of most recent registry calls).

In an embodiment, FRC 116 is configured to temporarily store the registry call information based on one or more storage rules. The storage rules can include at least one of mask rules, hive rules, or registry importance rules. These rules allow the system to selectively log registry call information based on predefined criteria, optimizing storage and processing efficiency. Mask rules can specify which parts of the registry should be stored and which parts can be skipped. For example, mask rules can specify that only registry call information related to security settings or critical system configurations is logged, while routine or non-essential registry call information is excluded from storage. As another example, mask rules can include techniques used to obfuscate, anonymize, or redact sensitive data to protect it from unauthorized access. As another example, hive rules can include enforced guidelines/procedures for managing and maintaining the structure and contents of registry hives in Windows operating systems.

In an embodiment, a registry call can affect a registry key and its sub-keys (e.g., during a single call). For example, a registry call can affect a registry key and its sub-keys in one or more of the following scenarios: recursive selection, permission changes, or backup and restore operations. For example, recursive deletion can include deleting all of the associated sub-keys and/or associated values when a registry key is deleted (e.g., in a single call). For example, permissions changes can change the security descriptors (e.g., permissions) of all associated sub-keys in addition to a registry key, modifying the permissions recursively. For example, during backup or restore operations, entire keys along with their sub-keys and values can be processed in one call.

In an embodiment, historical registry call information includes at least one of an actor associated with a previous registry call, or a timestamp associated with the previous registry call.

In an embodiment, PRC 114 stores an actor and/or a timestamp associated with a registry call (e.g., the registry call intercepted at 502).

At 510, method 500 comprises pushing registry call information. In an embodiment, registry call information is pushed from FRC 116 of EDR driver 106 to driver engine 128. Use of FRC 116 for pushing registry call information can improve efficiency and speed of the transfer, for example, as compared to the communication capabilities of PRC 114.

In an embodiment, pushing registry information (e.g., from FRC 116) can be based on one or more predefined policies, predefined policies include, for example, one or more of: real-time pushing, pushing based on predefined masks, pushing based on predefined hives (e.g., based on interest of EDR engine 128), or pushing based on predefined registry importance.

At 512, method 500 comprises providing historical registry information. In an embodiment, EDR driver 106 is configured to provide historical registry information from PRC 114 to driver engine 128 (e.g., in response to an incident investigation).

In an embodiment, EDR driver 106 receives a request from the EDR engine 128 to provide advanced registry information. The request from EDR engine 128 can be to configure a remediation action using the advanced registry information (e.g., historical registry information reflecting a previous state of the registry). For example, in response to detecting an anomalous or malicious event, EDR engine 128 can request advanced registry information from EDR driver 106 in order to generate a remediation action based on registry changes of the incident. In such an example, the advanced registry information can be stored exclusively on PRC 114 (e.g., not FRC 116).

In an embodiment, advanced registry call information can include a security context of the registry call. The security context can include, for example, biometric information associated with a user (e.g., the user making the registry call). The biometric information can be unique physical or behavioral characteristics used to identify and verify the user. These characteristics can be stable over time and difficult to replicate, making them effective for security and identification purposes. In an embodiment, biometric information can include fingerprints, facial recognition, voice recognition, behavioral biometrics (e.g., typing rhythm), and the like.

In an embodiment, security descriptors (e.g., in the context of Windows Registry) include information about permissions, ownership, and audit settings. Security descriptors can be used to determine users that can access or modify registry keys and their values.

In an embodiment, EDR driver 106 can automatically provide advanced registry information (e.g., stored in PRC 114) to the EDR engine 128. For example, EDR driver 106 can periodically provide advanced registry information (e.g., stored in PRC 114) to the EDR engine 128.

At 514, method 500 optionally comprises performing a response action. In an embodiment, the response action is based on the advanced registry information provided at 512. In an embodiment, the response action is based on registry information stored in EDR database 112. For example, EDR database 112 can store a complete set of registry changes based on registry change information pushed at 510.

In an embodiment, EDR driver 106 receives an indication (e.g., instructions) to perform a response action from EDR engine 128. In an embodiment, EDR driver 106 performs the response action. In examples, the response action can be a rollback of registry 104.

In an embodiment, EDR engine 128 performs a remediation action. The remediation action can be based on registry information previously pushed by FRC 116.

Method 500 accordingly provides for the ability to configure remediation actions based on data analysis, including the differentiation between retrieval and modification of registry keys based on the states of registry keys before and after execution (e.g., a change in the values of respective keys). Configurable remediation actions adds a layer of customization and security and facilitates timely and accurate remediation actions based on the current state of the system, historical data, and/or ongoing changes.

In an embodiment, method 500 can further comprise leveraging a dual cache mechanism. The use of a FRC and a PRC to manage different aspects of the data lifecycle allows for efficient integration with EDR system support. The FRC provides quick access to recently retrieved or modified registry keys/values for immediate response needs, while the PRC handles longer-term storage and complex data sets necessary for thorough incident analysis and remediation planning. Moreover, implementing a FRC and a PRC at the kernel mode allows for high-speed data processing and reduces the latency typically associated with user-mode interventions, enhancing overall system performance and security posture.

The invention claimed is:

1. A system for capturing and managing registry changes, the system comprising:
   a memory and at least one processor configured to implement an endpoint detection and response (EDR) driver configured to:
   intercept a registry call at a kernel mode;
   determine registry call information associated with the registry call, wherein the registry call information includes a registry key, a registry value of the registry key, sub-keys of the registry key, values associated with the sub-keys, data associated with the registry key and its sub-keys, a security descriptor of the registry key or the sub-keys, a post-execution state of the registry call, a pre-execution state of the registry call, a process of the registry call, an indication of a user, and a timestamp, wherein the pre-execution state of the registry call includes pre-execution values of the registry key and the sub-keys including: stored values of the registry key and the sub-keys in a fast registry cache (FRC) and stored values of the registry key and the sub-keys in a local persistent registry cache (PRC);

store the registry call information in the FRC and in the PRC, wherein the PRC further stores historical registry call information;

push the registry call information from the FRC to an EDR engine based on a predefined policy;

receive, from the EDR engine, a request to provide the historical registry information to configure a remediation action, wherein the request is based on an incident including a registry change; and provide, to the EDR engine, the historical registry information stored in PRC in response to the request.

2. The system of claim 1, wherein the EDR driver is further configured to:

receive, from the EDR engine, an indication to perform the remediation action; and perform the remediation action based on the indication.

3. The system of claim 1, wherein the EDR engine is configured to perform the remediation action.

4. The system of claim 1, wherein the FRC is configured to temporarily store the registry call information based on a storage rule.

5. The system of claim 4, wherein the storage rule includes at least one of mask rules, hive rules, or registry importance rules.

6. The system of claim 1, wherein the predefined policy includes at least one of real-time pushing, pushing based on predefined masks, pushing based on predefined hives, or pushing based on predefined registry importance.

7. The system of claim 1, wherein the EDR driver is further configured to determine that the registry value of the registry key or the values of the sub-keys were modified by the registry call based on a comparison of the post-execution state of the registry call to the pre-execution state of the registry call.

8. The system of claim 7, wherein the determination that the registry value of the registry key or the values of the sub-keys were modified by the registry call is based on the stored values of the registry key and the sub-keys in the PRC when the stored values of the registry key and the sub-keys are not in the FRC.

9. The system of claim 7, wherein the determination that the registry value of the registry key or the values of the sub-keys were modified by the registry call is based on the original value of the registry key in the system.

10. The system of claim 1, wherein the PRC further stores biometric information associated with the user.

11. The system of claim 1, wherein the EDR driver is further configured to:

detect that the registry call is part of a transaction;

determine transaction information associated with the transaction, including the registry key, the sub-keys, the registry value of the registry key, the values associated with the sub-keys, and the security descriptor of the registry key or the sub-keys involved in the transaction;

determine an outcome of the transaction to be a commit or a rollback;

store the transaction information in the fast registry cache (FRC) and the persistent registry cache (PRC);

in the case of a commit, update the stored registry call information in the FRC and PRC to reflect the committed changes; and in the case of a rollback, revert the stored registry call information in the FRC and PRC to the pre-execution state of the registry call.

12. A method for operating an endpoint detection and response (EDR) driver, the method comprising:

intercepting a registry call at a kernel mode;

determining registry call information associated with the registry call, wherein the registry call information includes a registry key, a registry value of the registry key, sub-keys of the registry key, values associated with the sub-keys, data associated with the registry key and its sub-keys, a security descriptors of the registry key or the sub-keys, a post-execution state of the registry call key or the sub-keys, and a pre-execution state of the registry call, wherein the pre-execution state of the registry call includes pre-execution values of the registry key and the sub-keys, a process of the registry call, an indication of a user, and a timestamp, wherein the pre-execution state of the registry call includes pre-execution values of the registry key and the sub-keys including stored values of the registry key and the sub-keys in a fast registry cache (FRC) and stored values of the registry key and the sub-keys in a local persistent registry cache (PRC);

storing the registry call information in the FRC and in the PRC, wherein the PRC further stores advanced registry information including historical registry call information;

pushing the registry call information from the FRC to an EDR engine based on a predefined policy;

receiving from the EDR engine, a request to provide the advanced registry information to configure a remediation action, wherein the request is based on an incident including a registry change; and providing, to the EDR engine, the advanced registry information stored in PRC in response to the request.

13. The method of claim 12, further comprising:

receiving, from the EDR engine, an indication to perform the remediation action; and performing the remediation action based on the indication.

14. The method of claim 12, wherein the EDR engine is configured to perform the remediation action.

15. The method of claim 12, wherein the FRC is configured to temporarily store the registry call information based on at least one of mask storage rules, hive storage rules, or registry importance storage rules.

16. The method of claim 12, further comprising determining that the registry value of the registry key or the values of the sub-keys were modified by the registry call based on a comparison of the post-execution state of the registry call to the pre-execution state of the registry call.

17. The method of claim 16, wherein determining that the registry value of the registry key or the values of the sub-keys were modified by the registry call is based on the stored values of the registry key and the sub-keys the PRC when the stored values of the registry key and the sub-keys are not in the FRC.

18. The method of claim 16, wherein determining that registry value of the registry key or the values of the sub-keys were modified by the registry call is based on the original value of the registry key in the system.

19. The method of claim 12, wherein the advanced registry call information further includes biometric information associated with the user.

20. A non-transitory computer readable medium comprising instruction that, when executed by a processor, cause the processor to implement:

an endpoint detection and response (EDR) service configured to:

intercept a registry call at a kernel mode;

determine registry call information associated with the registry call, wherein the registry call information includes a registry key, a registry value of the registry key, sub-keys of the registry key, values associated with the sub-keys, data associated with the registry key and its sub-keys, a security descriptors of the registry key or the sub-keys, a post-execution state of the registry call key or the sub-keys, and a pre-execution state of the registry call, wherein the pre-execution state of the registry call includes pre-execution values of the registry key and the sub-keys, a process of the registry call, an indication of a user, and a timestamp, wherein the pre-execution state of the registry call includes pre-execution values of the registry key and the sub-keys including: stored values of the registry key and the sub-keys in a fast registry cache (FRC) and stored values of the registry key and the sub-keys in a local persistent registry cache (PRC);

store the registry call information in the FRC and in the PRC, wherein the PRC further stores advanced registry information including historical registry call information;

push the registry call information from the FRC to an EDR engine based on a predefined policy;

receive, from the EDR engine, a request to provide the advanced registry information to configure a remediation action, wherein the request is based on an incident including a registry change; and provide, to the EDR engine, the advanced registry information in response to the request.

\* \* \* \* \*